(12) United States Patent
Lee (10) Patent No.: US 11,724,741 B2
(45) Date of Patent: Aug. 15, 2023

(54) SYSTEM AND METHOD OF PROVIDING PARKING GUIDANCE SERVICE OF VEHICLE

(71) Applicant: HYUNDAI MOBIS CO., LTD., Seoul (KR)

(72) Inventor: Il Gyu Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 131 days.

(21) Appl. No.: 17/126,763

(22) Filed: Dec. 18, 2020

(65) Prior Publication Data
US 2021/0229743 A1 Jul. 29, 2021

(30) Foreign Application Priority Data

Jan. 23, 2020 (KR) .......................... 10-2020-0009414

(51) Int. Cl.
*B62D 15/02* (2006.01)
*G08G 1/14* (2006.01)
*G01C 21/36* (2006.01)
*G01C 21/34* (2006.01)
*B60T 17/22* (2006.01)

(52) U.S. Cl.
CPC ....... *B62D 15/028* (2013.01); *G01C 21/3407* (2013.01); *G01C 21/365* (2013.01); *G01C 21/3697* (2013.01); *G08G 1/14* (2013.01); *B60T 17/221* (2013.01)

(58) Field of Classification Search
USPC ......................................................... 701/428
See application file for complete search history.

(56) References Cited

U.S. PATENT DOCUMENTS

| 2016/0144856 | A1* | 5/2016 | Kim ...................... B62D 15/027 701/36 |
| 2020/0172089 | A1* | 6/2020 | Dyer ..................... G05D 1/0221 |

FOREIGN PATENT DOCUMENTS

| EP | 3072710 A1 * | 9/2016 | ............... B60D 1/30 |
| JP | 6509361 B2 * | 5/2019 | ............... G08G 1/14 |
| KR | 10-1787057 B1 | 11/2017 | |

* cited by examiner

*Primary Examiner* — Maceeh Anwari
(74) *Attorney, Agent, or Firm* — NSIP Law (57) ABSTRACT

Disclosed is a system of providing a parking guidance service of a vehicle including a sensor unit including a plurality of sensors configured to sense an environment around the vehicle and a parking space, a database unit configured to store parking pattern data of a driver, a controller configured to determine a parking difficulty of the parking space based on information sensed by the sensor unit and parking pattern data of the driver, stored in the database unit, and an output unit configured to provide information on the parking difficulty of the parking space, determined by the controller.

16 Claims, 4 Drawing Sheets

SYSTEM AND METHOD OF PROVIDING PARKING GUIDANCE SERVICE OF VEHICLE

CROSS-REFERENCE TO THE RELATED APPLICATION

This application claims priority from Korean Patent Application No. 10-2020-0009414, filed on Jan. 23, 2020, in the Korean Intellectual Property Office, the disclosure of which is incorporated herein by reference in its entirety.

BACKGROUND OF THE INVENTION

1. Field of the Invention

The present disclosure relates to a system and method of providing a parking guidance service of a vehicle, and more particularly to a system and method of providing a parking guidance service of a vehicle for providing information on a parking difficulty of a parking space based on a parking pattern of a driver, to the driver.

2. Description of the Related Art

Recently, parking assistance-related technologies for assisting a driver in parking in order to allow the driver to more conveniently and easily park have been developed, and thereamong, technology of a smart parking assistance system (SPAS) has been developed.

The SPAS is a system for controlling a steering wheel in order to autonomously park irrespective of notifications and warnings and instructing the driver to only control shifting, and currently, has been realized by each development company using a parking method using a remote controller and a method of performing only shift control by a driver in a vehicle.

Parking assistance-related technologies have been developed to support parallel parking and angle parking. However, a conventional SPAS has a problem in that a relatively long time is taken to park through a corresponding function. In addition, in reality, there is a limit in that it is very difficult to park a vehicle through a remote controller after a driver gets out of the vehicle in a section in which vehicles are dense and crowded, such as a city.

Accordingly, there has been a need to develop a parking assistance technology to be more practically used by a user.

SUMMARY OF THE INVENTION

An object of the present disclosure is to provide a system and method of providing a parking guidance service of a vehicle for allowing a driver to more conveniently and easily park the vehicle while parking the vehicle by providing information on a parking difficulty of a parking space to the driver based on information sensed through a sensor unit and parking pattern data of the driver, stored in a database unit.

According to an embodiment of the present disclosure, a system of providing a parking guidance service of a vehicle including a sensor unit including a plurality of sensors configured to sense an environment around the vehicle and a parking space, a database unit configured to store parking pattern data of a driver, a controller configured to determine a parking difficulty of the parking space based on information sensed by the sensor unit and parking pattern data of the driver, stored in the database unit, and an output unit configured to provide information on the parking difficulty of the parking space, determined by the controller.

The sensor unit may include one or more of a plurality of camera sensors, an ultrasonic sensor, a radar sensor, a LiDAR sensor, and a GPS sensor.

The controller may include one or more of, a signal processor configured to process a signal sensed through the sensor unit, a first parking trajectory generator configured to generate a parking trajectory of a subject vehicle based on one or more of information sensed by the sensor unit and information on a width of the subject vehicle, a second parking trajectory generator configured to generate a parking trajectory of the subject vehicle based on the parking pattern data of the driver stored in the database unit, a travel trajectory generator configured to generate a travel trajectory of another nearby vehicle based on one or more of the information sensed by the sensor unit and the information on the width of the subject vehicle, a parking difficulty determiner configured to determine the parking difficulty of the parking space based on the parking trajectory of the subject vehicle generated by the first parking trajectory generator, the parking trajectory of the subject vehicle generated by the second parking trajectory generator, and the travel trajectory of the other nearby vehicle generated by the travel trajectory generator, and a parking pattern extractor configured to extract the parking pattern of the driver based on the parking environment information sensed by the sensor unit, and steering and braking signals of the vehicle while the driver parks the vehicle.

With respect to the parking space, when the parking trajectory generated by the first parking trajectory generator is outside a preset range or more based on the parking trajectory generated by the second parking trajectory generator, the parking difficulty determiner may determine that the parking space has a high parking difficulty.

With respect to the parking space, when the parking trajectory generated by the first parking trajectory generator is within a preset range based on the parking trajectory generated by the second parking trajectory generator, the parking difficulty determiner may determine that the parking space has a low parking difficulty.

With respect to the parking space, when the parking trajectory generated by the first parking trajectory generator or the parking trajectory generated by the second parking trajectory generator overlaps with the travel trajectory of the other nearby vehicle generated by the travel trajectory generator, the parking difficulty determiner may determine that the vehicle is not capable of being parked in the parking space.

The system may further include a setting unit configured to automatically or manually set an operation of the sensor unit.

The controller may update the parking pattern data in the database unit after the vehicle is completely parked.

According to another embodiment of the present disclosure, a method of providing a parking guidance service of a vehicle includes determining whether the vehicle enters a parking lot, upon determining that the vehicle enters the parking lot, searching for a parking space through a sensor unit, determining a parking difficulty of the parking space based on information sensed by the sensor unit and pre-stored parking pattern data of a driver with respect to the found parking space, and providing information on the determined parking difficulty to the driver.

The method may further include, prior to the determining whether the vehicle enters the parking lot, storing parking pattern information of the driver in a database unit.

The method may further include, after the providing the information, updating the parking pattern data in a database unit.

The determining the parking difficulty of the parking space may include generating a first parking trajectory based on one or more of information sensed by the sensor unit and information on a width of a subject vehicle with respect to the parking space, generating a second parking trajectory based on the parking pattern data of the driver, pre-stored in a database unit, generating a travel trajectory of another nearby vehicle based on one or more of the information sensed by the sensor unit and the information on the width of the subject vehicle, and determining the parking difficulty of the parking space based on the first parking trajectory, the second parking trajectory, and the travel trajectory.

The determining the parking difficulty of the parking space based on the first parking trajectory, the second parking trajectory, and the travel trajectory may include determining that the parking space has a high parking difficulty when the first parking trajectory is outside a preset range or more based on the second parking trajectory.

The determining the parking difficulty of the parking space based on the first parking trajectory, the second parking trajectory, and the travel trajectory may include determining that the parking space has a low parking difficulty when the first parking trajectory is within a preset range based on the second parking trajectory.

The determining the parking difficulty of the parking space based on the first parking trajectory, the second parking trajectory, and the travel trajectory may include determining that the vehicle is not capable of being parked in the parking space when the first parking trajectory or the second parking trajectory overlaps with the travel trajectory.

The method may further include automatically or manually setting an operation of the sensor unit.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to exemplary embodiments of the present disclosure, examples of which are illustrated in the accompanying drawings. The terms and words which are used in the present specification and the appended claims should not be construed as being confined to common meanings or dictionary meanings but should be construed as meanings and concepts matching the technical spirit of the present disclosure in order to describe the present disclosure in the best fashion.

Thus, embodiments described in the specification and components shown in the drawings are a merely exemplary embodiment of the present disclosure and do not represent all technological features of the present disclosure, and thus, it is to be appreciated that various equivalents and modifications can be made to substitute the features when the application is filed.

Figure 1:
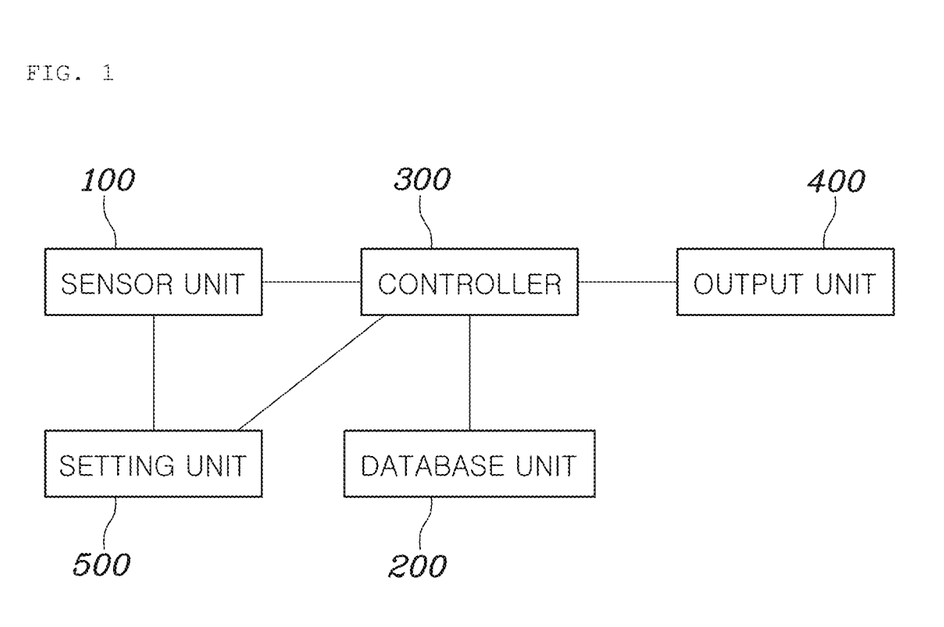
FIG. 1 is a block diagram showing the overall configuration of a system for providing a parking guidance service of a vehicle according to an embodiment of the present disclosure.
Figure 2:
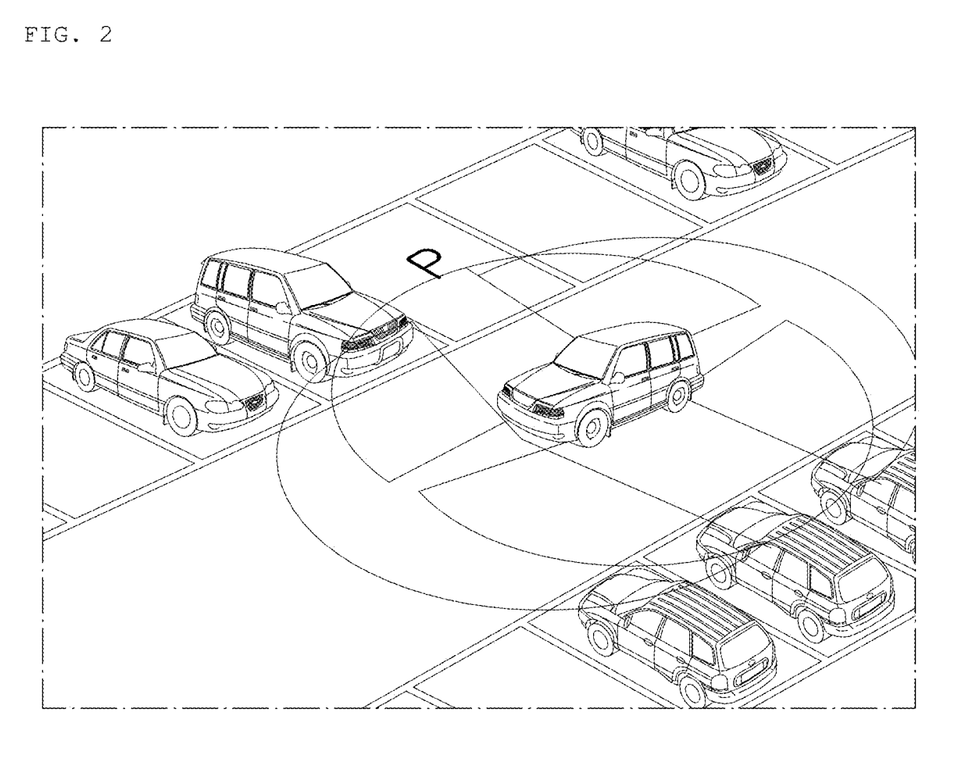
FIG. 2 is a diagram showing the case in which a sensor unit of a system for providing a parking guidance service of a vehicle senses a parking space according to an embodiment of the present disclosure.
Figure 3:
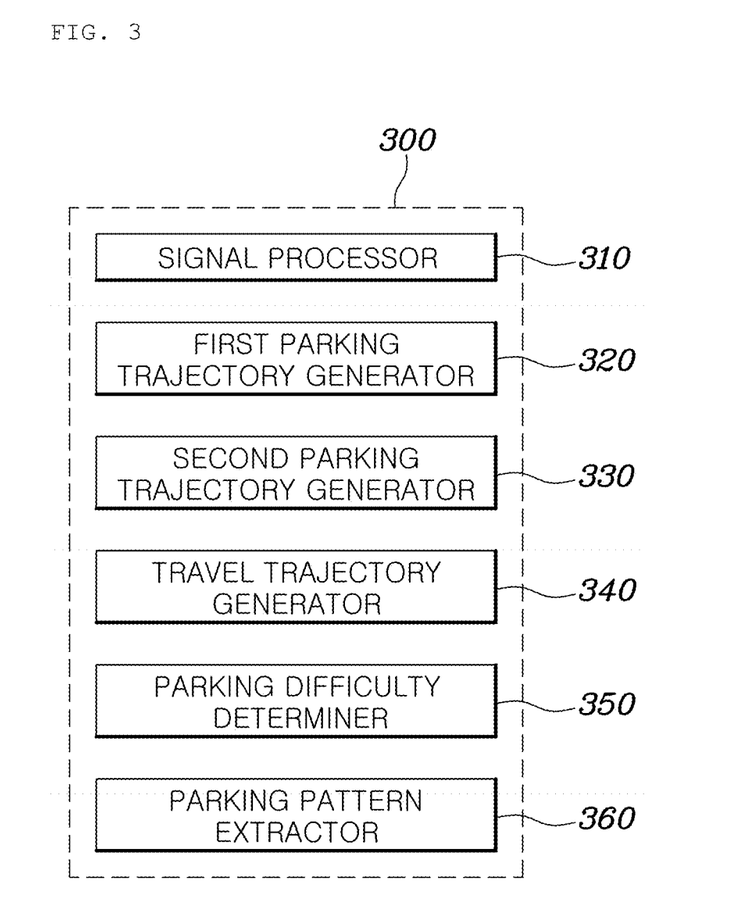
FIG. 3 is a block diagram showing the detailed configuration of a controller of a system for providing a parking guidance service of a vehicle according to an embodiment of the present disclosure.

FIG. 1 is a block diagram showing the overall configuration of a system for providing a parking guidance service of a vehicle according to an embodiment of the present disclosure. FIG. 2 is a diagram showing the case in which a sensor unit of a system for providing a parking guidance service of a vehicle senses a parking space according to an embodiment of the present disclosure. FIG. 3 is a block diagram showing the detailed configuration of a controller of a system for providing a parking guidance service of a vehicle according to an embodiment of the present disclosure.

Referring to FIG. 1, the system for providing a parking guidance service of a vehicle according to an embodiment of the present disclosure may include a sensor unit 100, a database unit 200, a controller 300, and an output unit 400, and may further include a setting unit 500.

The sensor unit 100 may sense an environment around the vehicle and a parking space. In some embodiments, the sensor unit 100 may include one or more of a plurality of camera sensors, a radar sensor, a LiDAR sensor, and an ultrasonic sensor, which are installed at a front side, a rear side, and a lateral side of the vehicle and sense information on the front side, the rear side, and the lateral side of the vehicle, and may further include a GPS sensor.

In detail, the sensor unit 100 may sense the environment around the vehicle and the parking space through the camera sensor, the ultrasonic sensor, the radar sensor, the LiDAR sensor, or the GPS sensor in the vehicle. Here, the information sensed through the camera sensor or the GPS sensor may be transferred to the controller 300 to be described below via CAN communication, and the controller 300 may determine whether the vehicle enters a parking lot or is positioned in a road, a vacant lot, or the like, but not a parking lot, based on the transferred information.

Here, the radar sensor, the LiDAR sensor, and the ultrasonic sensor that are installed in the vehicle may measure a distance between the vehicle and a target. In detail, the radar sensor and the LiDAR sensor may sense information on a target around the vehicle, including a distance to the target and a direction of the target, based on reflected light obtained by emitting a laser beam to the target and reflecting the light from the target. Technology for sensing information on a target through a radar sensor and a LiDAR sensor is already known, and thus the detailed description thereof will be omitted.

The ultrasonic sensor may measure the distance to the target based on a time taken to receive an ultrasonic wave (20 kHz to 1 MHz) reflected from the target after transmitting the ultrasonic wave to the target. Technology for calculating a distance to a target through an ultrasonic sensor is already known, and thus a detailed description thereof will be omitted.

The sensor unit 100 may sense the environment around the vehicle and the parking space through the aforementioned plurality of sensors, as shown in FIG. 2.

The database unit 200 may store parking pattern data of a driver. The database unit 200 may store information on detailed specifications of the vehicle or the like as well as the width of the vehicle. Here, the parking pattern data of the driver may include rotation angle information about when and how much to rotate a steering wheel when a driver parks in a specific parking space, free space information on the size of a free space used to rotate the steering wheel, and information on the number of times that the steering wheel has been rotated and the vehicle has moved forward and backward in order for the driver to park in the parking space.

In other words, whenever the driver parks the vehicle, the database unit 200 may store a plurality of pieces of parking pattern data about the size of a free space used to rotate the steering wheel, about when to rotate the steering wheel, and about the number of times that the steering wheel has been rotated and the vehicle has moved forward and backward in order to park in a corresponding parking space.

The controller 300 may determine a parking difficulty of the parking space based on the information sensed through the sensor unit 100 and the parking pattern data of the driver stored in the database unit 200.

In detail, the controller 300 may include one or more of a signal processor 310, a first parking trajectory generator 320, a second parking trajectory generator 330, a travel trajectory generator 340, a parking difficulty determiner 350, and a parking pattern extractor 360, as shown in FIG. 3.

In more detail, the signal processor 310 may process the signal sensed through the sensor unit 100. In some embodiments, the signal processor 310 may include a camera signal processor for processing a signal sensed and transferred by a camera sensor, a radar/LiDAR sensor signal processor for processing a signal sensed and transferred by a radar sensor and a LiDAR sensor, an ultrasonic sensor signal processor for processing a signal sensed and transferred by an ultrasonic sensor, a steering/braking sensor signal processor for processing a signal sensed and transferred by a steering and braking sensor while parking the vehicle, and the like.

The first parking trajectory generator 320 may generate a parking trajectory of a subject vehicle based on one or more of information sensed by the sensor unit 100 and information on the width of the subject vehicle, pre-stored in the database unit 200. In other words, the first parking trajectory generator 320 may generate information on a parking trajectory along which a vehicle having a specific width needs to be parked in a specific parking space, based on the information on the environment around the vehicle and the information on the width of the vehicle, which are sensed through the plurality of camera sensors, the ultrasonic sensor, the radar sensor, the LiDAR sensor, and the like.

The second parking trajectory generator 330 may generate the parking trajectory of the subject vehicle based on the parking pattern data of the driver, stored in the database unit 200. In other words, the second parking trajectory generator 330 may generate a parking trajectory along which a vehicle needs to be parked in a parking space in consideration of the parking pattern of the driver, stored in the database unit 200.

The travel trajectory generator 340 may generate a travel trajectory of another nearby vehicle based on one or more of the information sensed by the sensor unit 100 and the information on the width of the subject vehicle stored in the database unit 200. In other words, the travel trajectory generator 340 may generate information on a travel trajectory along which another vehicle around the vehicle, sensed by the plurality of camera sensors, the ultrasonic sensor, the radar sensor, and the LiDAR sensor, travels.

The parking difficulty determiner 350 may determine a parking difficulty of a parking space based on the parking trajectory of the subject vehicle generated by the first parking trajectory generator 320, the parking trajectory of the subject vehicle generated by the second parking trajectory generator 330, and the travel trajectory of another vehicle generated by the travel trajectory generator 340.

In detail, with respect to the parking space as a parking target, when the parking trajectory generated by the first parking trajectory generator 320 is outside a preset range or more based on the parking trajectory generated by the second parking trajectory generator 330, the parking difficulty determiner 350 may determine a parking difficulty of the parking space to be high. Here, with respect to the parking space as a parking target, when the parking trajectory generated by the first parking trajectory generator 320 is outside a preset range or more based on the parking trajectory generated by the second parking trajectory generator 330, this means that, when a driver controls a rotation angle of steering and the braking and speed of the vehicle according to a usual parking tendency/pattern in order to park in a corresponding parking space, the vehicle moves outside the parking trajectory in which the vehicle is capable of being stably parked in the corresponding parking space, and accordingly, in this case, the parking difficulty determiner 350 may determine that the corresponding parking space has a high parking difficulty.

On the other hand, with respect to the parking space as a parking target, when the parking trajectory generated by the first parking trajectory generator 320 is within a preset range based on the parking trajectory generated by the second parking trajectory generator 330, the parking difficulty determiner 350 may determine that the corresponding parking space has a low parking difficulty. Here, with respect to the parking space as a parking target, when the parking trajectory generated by the first parking trajectory generator 320 is within a preset range based on the parking trajectory generated by the second parking trajectory generator 330, this means that, when a driver controls a rotation angle of steering and the braking and speed of the vehicle according to a usual parking tendency/pattern in order to park in a corresponding parking space, the vehicle is positioned within the parking trajectory in which the vehicle is capable of being stably parked in the corresponding parking space, and accordingly, in this case, the parking difficulty determiner 350 may determine that the corresponding parking space has a low parking difficulty.

The parking difficulty determiner 350 may determine a parking difficulty based on information on the number of times that the steering wheel has been rotated and the vehicle has moved forward and backward in order for the driver to park in the parking space, pre-stored in a data storage. For example, the parking difficulty determiner 350 may determine that a parking difficulty is low when the number of times that the steering wheel has been rotated and the vehicle has moved forward and backward in order to park in the parking space is equal to or less than 3, the parking difficulty determiner 350 may determine that the parking difficulty is medium when the number of times is between 3 and 5, and the parking difficulty determiner 350 may determine that the parking difficulty is high when the number of times is equal to or greater than 5.

With respect to the parking space as a parking target, when the parking trajectory generated by the first parking trajectory generator 320 or the parking trajectory generated by the second parking trajectory generator 330 overlaps with the travel trajectory of another nearby vehicle generated by the travel trajectory generator 340, the parking difficulty determiner 350 may determine that the vehicle is not capable of being parked in the corresponding parking space. Here, when the parking trajectory generated by the first parking trajectory generator 320 or the parking trajectory generated by the second parking trajectory generator 330 overlaps with the travel trajectory of another nearby vehicle generated by the travel trajectory generator 340, this means that the vehicle is likely to collide with another nearby vehicle when parked in the corresponding parking space, and accordingly, in this case, the parking difficulty determiner 350 may determine that the vehicle is not capable of being parked in the corresponding parking space.

The parking pattern extractor 360 may extract the parking pattern of the driver based on parking environment information sensed by the sensor unit, and steering and braking signals of the vehicle while the driver parks the vehicle. In some embodiments, the parking pattern extractor 360 may extract the parking pattern of the driver while parking the vehicle in the parking space by receiving parking environment information including information on the width of a parking space as a parking target, whether another vehicle is parked around the corresponding parking space, and the distance between another vehicle and the parking space through sensing information sensed by the sensor unit, receiving a steering control signal while parking through motor driven power steering (MDPS), receiving a shift control signal while parking through shift-by-wire (ShBW), receiving the speed of the vehicle from an integrated MOBIS electronic brake (iMEB), receiving an automatic and emergency braking signal while parking through an integrated electronic braking device, and receiving information on braking of the vehicle while parking through a fuel-cell control unit (FCU) in the case of a manual fuel vehicle. The extracted parking pattern data may be stored in the database unit 200.

The sensor unit 100 and the controller 300 may transmit the signal sensed by the sensor unit 100 to the controller 300 through CAN communication or LIM communication.

The controller 300 may update the parking pattern data in the database unit 200 after parking is completed. As such, the controller 300 may extract a more accurate parking pattern based on as much parking pattern data as possible by updating the parking pattern data in the database unit 200 whenever parking is completed.

The output unit 400 may provide information on a parking difficulty of the parking space determined by the controller 300, to the driver. In some embodiments, the information on the parking difficulty of the parking space determined by the controller 300 may be visually provided to the driver through the output unit 400, or according to another embodiment, may be acoustically provided to the driver.

In some embodiments, the output unit 400 may be a cluster, a head up display (HUD), an audio video navigation (AVN), a speaker, and the like. Information on a parking difficulty of a parking space determined by the controller, for example, parallel parking is currently possible but is very difficult, angle parking is currently possible but a driver has a difficulty in getting out of a vehicle after parking, or parallel parking is possible, may be provide to the driver through the output unit.

However, this is merely exemplary, and thus various other devices may be used as the output unit according to the present disclosure as long as the devices provide information on the parking difficulty of the parking space determined by the controller 300 to the driver.

As such, the embodiments of the present disclosure may overcome the conventional inconvenience in which a driver determines that parking is not possible after attempting to park a vehicle in a narrow parking space at a road side or a crowded parking lot in city and then needs to look for another parking space.

The setting unit 500 may automatically or manually set an operation of the sensor unit 100. The setting unit 500 may set whether the information on the parking difficulty of the parking space is visually or acoustically provided through the output unit 400.

In some embodiments, when the operation of the sensor unit 100 is automatically set, if the vehicle enters an available parking space of a parking lot or the like, the sensor unit 100 may be automatically operated to sense the environment around the vehicle and the parking space and to transmit the sensed information to the controller 300, and the controller 300 may provide information on a parking difficulty of the corresponding parking space to the driver through the output unit 400 based on the sensing information transmitted from the sensor unit 100.

In some embodiments, when the vehicle enters a space such as a road or a vacant lot, but not an official parking lot, the setting unit 500 may set the sensor unit 100 to be manually operated. In this case, the sensor unit 100 may sense the environment around the vehicle and the parking space based on the current position of the vehicle.

Figure 4:
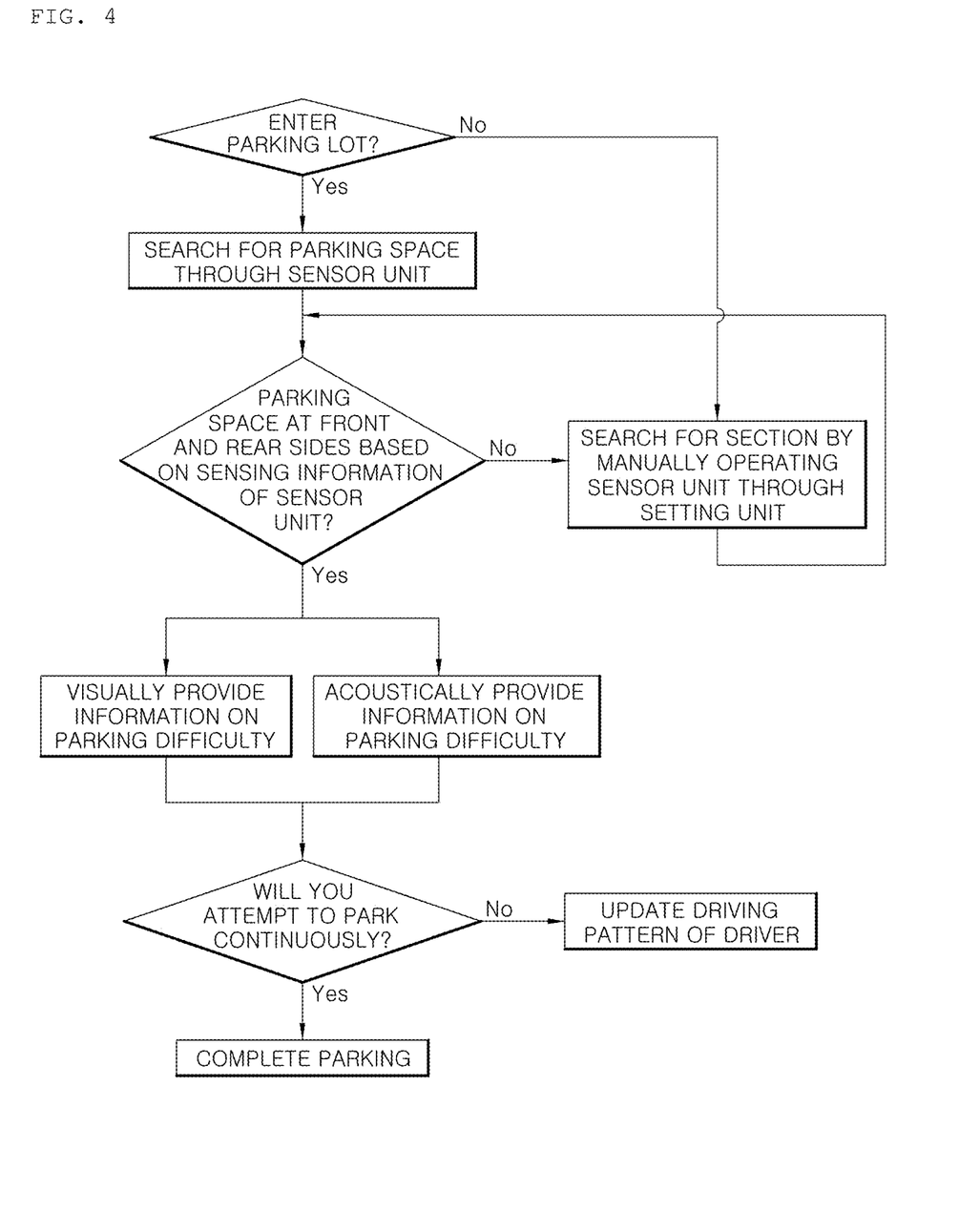
FIG. 4 is a flowchart of a method of providing a parking guidance service of a vehicle according to an embodiment of the present disclosure.

Referring to FIG. 4, a method of providing a parking guidance service of a vehicle according to an embodiment of the present disclosure may include (1) determining whether the vehicle enters a parking lot, (2) upon determining that the vehicle enters the parking lot, searching for a parking space through a sensor unit, (3) determining a parking difficulty of the parking space based on information sensed by the sensor unit and pre-stored parking pattern data of a driver with respect to the found parking space, and (4) providing information on the determined parking difficulty to the driver.

The method of providing a parking guidance service of a vehicle according to an embodiment of the present disclosure may further include, prior to (1) the determining whether the vehicle enters the parking lot, storing parking pattern information of the driver in a database unit.

The method may further include, after (4) the providing the information on the determined parking difficulty to the driver, updating parking pattern data in the database unit after the vehicle is completely parked.

In detail, (3) the determining a parking difficulty of a parking space based on information sensed by the sensor unit and the pre-stored parking pattern data of a driver with respect to the found parking space may include (3-1) generating a first parking trajectory based on one or more of information sensed by the sensor unit and information on the width of the subject vehicle with respect to the parking space, (3-2) generating a second parking trajectory based on the parking pattern data of a driver, pre-stored in the database unit, (3-3) generating a travel trajectory of another nearby vehicle based on one or more of the information sensed by the sensor unit and the information on the width of the subject vehicle, and (3-4) determining the parking difficulty of the parking space based on the first parking trajectory, the second parking trajectory, and the travel trajectory.

In more detail, in operation (3-4), when the first parking trajectory is outside a preset range or more based on the second parking trajectory, the parking difficulty of the parking space may be determined to be high.

In operation (3-4), when the first parking trajectory or the second parking trajectory overlaps with the travel trajectory, it may be determined that parking in the parking space is not possible.

The method of providing a parking guidance service of a vehicle according to an embodiment of the present disclosure may further include automatically or manually setting an operation of the sensor unit.

The embodiments of the present disclosure may overcome the inconvenience in which a driver attempts to park a vehicle in a parking space such as a parking lot and then needs to look for another parking space due to the previous narrow parking space by providing information on a parking difficulty of a parking space based on information sensed through a sensor unit and parking pattern data of the driver, stored in a database unit, to the driver.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A system of providing a parking guidance service of a vehicle, the system comprising:
   a sensor unit comprising a plurality of sensors configured to sense an environment around the vehicle and a parking space;
   a database unit configured to store parking pattern data of a driver comprising a number of times that a steering wheel is to be rotated and/or the vehicle is to be moved forward and backward for the driver to park the vehicle in the parking space;
   a controller configured to determine a parking difficulty of the parking space based on information sensed by the sensor unit and the parking pattern data of the driver, stored in the database unit;
   an output unit configured to provide information on the parking difficulty of the parking space, determined by the controller;
   a first parking trajectory generator configured to generate a parking trajectory of a subject vehicle based on one or more of information sensed by the sensor unit and information on a width of the subject vehicle;
   a second parking trajectory generator configured to generate a parking trajectory of the subject vehicle based on the parking pattern data of the driver stored in the database unit;
   a travel trajectory generator configured to generate a travel trajectory of another nearby vehicle based on one or more of the information sensed by the sensor unit and the information on the width of the subject vehicle; and
   a parking difficulty determiner configured to determine the parking difficulty of the parking space based on the parking trajectory of the subject vehicle generated by the first parking trajectory generator, the parking trajectory of the subject vehicle generated by the second parking trajectory generator, and the travel trajectory of the other nearby vehicle generated by the travel trajectory generator.

2. The system of claim 1, wherein the sensor unit comprises one or more of a plurality of camera sensors, an ultrasonic sensor, a radar sensor, a LiDAR sensor, and a GPS sensor.

3. The system of claim 1, wherein the controller comprises:
   a signal processor configured to process a signal sensed through the sensor unit; and
   a parking pattern extractor configured to extract the parking pattern of the driver based on the parking environment information sensed by the sensor unit, and steering and braking signals of the vehicle while the driver parks the vehicle.

4. The system of claim 3, wherein
   with respect to the parking space, in response to the parking trajectory generated by the first parking trajectory generator being outside a preset range or more based on the parking trajectory generated by the second parking trajectory generator, the parking difficulty determiner is configured to determine that the parking space has a high parking difficulty, and
   the preset range corresponds to the number of times that the steering wheel is to be rotated and/or the vehicle is to be moved forward and backward for the driver to park the vehicle in the parking space.

5. The system of claim 3, wherein
   with respect to the parking space, in response to the parking trajectory generated by the first parking trajectory generator being within a preset range based on the parking trajectory generated by the second parking trajectory generator, the parking difficulty determiner is configured to determine that the parking space has a low parking difficulty, and
   the preset range corresponds to the number of times that a steering wheel is to be rotated and/or the vehicle is to be moved forward and backward for the driver to park the vehicle in the parking space.

6. The system of claim 3, wherein, with respect to the parking space, in response to the parking trajectory generated by the first parking trajectory generator or the parking trajectory generated by the second parking trajectory generator overlapping with the travel trajectory of the other nearby vehicle generated by the travel trajectory generator, the parking difficulty determiner is configured to determine that the vehicle is not capable of being parked in the parking space.

7. The system of claim 1, further comprising a setting unit configured to automatically or manually set an operation of the sensor unit.

8. The system of claim 1, wherein the controller updates the parking pattern data in the database unit after the vehicle is completely parked.

9. A method of providing a parking guidance service of a vehicle, the method comprising:
   determining, through a sensor unit, whether the vehicle enters a parking lot;
   upon determining that the vehicle enters the parking lot, searching for a parking space through the sensor unit;
   determining, through a controller, a parking difficulty of the parking space based on information sensed by the sensor unit and pre-stored parking pattern data of a driver with respect to the found parking space, the pre-stored parking pattern data comprising a number of times that a steering wheel is to be rotated and/or the vehicle is to be moved forward and backward for the driver to park the vehicle in the parking space;
   providing, through an output unit, information on the determined parking difficulty to the driver;
   generating a first parking trajectory based on one or more of information sensed by the sensor unit and information on a width of a subject vehicle with respect to the parking space;

generating a second parking trajectory based on the parking pattern data of the driver, pre-stored in a database unit;

generating, a travel trajectory of another nearby vehicle based on one or more of the information sensed by the sensor unit and the information on the width of the subject vehicle; and determining the parking difficulty of the parking space based on the first parking trajectory, the second parking trajectory, and the travel trajectory.

10. The method of claim 9, further comprising: prior to the determining whether the vehicle enters the parking lot, storing parking pattern information of the driver in the database unit.

11. The method of claim 9, further comprising: after the providing the information, updating the parking pattern data in the database unit.

12. The method of claim 9, wherein the determining the parking difficulty of the parking space based on the first parking trajectory, the second parking trajectory, and the travel trajectory comprises determining that the parking space has a high parking difficulty in response to the first parking trajectory being outside a preset range or more based on the second parking trajectory, and the preset range corresponds to the number of times that the steering wheel is to be rotated and/or the vehicle is to be moved forward and backward for the driver to park the vehicle in the parking space.

13. The method of claim 9, wherein the determining the parking difficulty of the parking space based on the first parking trajectory, the second parking trajectory, and the travel trajectory comprises determining that the parking space has a low parking difficulty in response to the first parking trajectory being within a preset range based on the second parking trajectory, and the preset range corresponds to the number of times that the steering wheel is to be rotated and/or the vehicle is to be moved forward and backward for the driver to park the vehicle in the parking space.

14. The method of claim 9, wherein the determining the parking difficulty of the parking space based on the first parking trajectory, the second parking trajectory, and the travel trajectory comprises determining that the vehicle is not capable of being parked in the parking space in response to the first parking trajectory or the second parking trajectory overlapping with the travel trajectory.

15. The method of claim 9, further comprising automatically or manually setting an operation of the sensor unit.

16. A system of providing a parking guidance service of a vehicle, the system comprising:
- a sensor unit configured to sense an environment around the vehicle and a parking space;
- a database unit configured to store parking pattern data of a driver comprising a number of times that the vehicle is to be moved forward and backward for the driver to park the vehicle in the parking space;
- a controller configured to determine a parking difficulty of the parking space based on information sensed by the plurality of sensors and the parking pattern data of the driver, stored in the database;
- a display or speaker configured to render information on the parking difficulty of the parking space as determined by the controller;
- a first parking trajectory generator configured to generate a parking trajectory of a subject vehicle based on one or more of information sensed by the sensor unit and information on a width of the subject vehicle;
- a second parking trajectory generator configured to generate a parking trajectory of the subject vehicle based on the parking pattern data of the driver stored in the database unit;
- a travel trajectory generator configured to generate a travel trajectory of another nearby vehicle based on one or more of the information sensed by the sensor unit and the information on the width of the subject vehicle; and
- a parking difficulty determiner configured to determine the parking difficulty of the parking space based on the parking trajectory of the subject vehicle generated by the first parking trajectory generator, the parking trajectory of the subject vehicle generated by the second parking trajectory generator, and the travel trajectory of the other nearby vehicle generated by the travel trajectory generator.

* * * * *